March 12, 1929.  E. J. GULICK  1,704,740

STEERING ROD CONNECTION

Original Filed Nov. 30, 1917

Inventor
Edward J. Gulick
By Miller Sibbetts
Attorney

Patented Mar. 12, 1929.

1,704,740

UNITED STATES PATENT OFFICE.

EDWARD J. GULICK, OF ELKHART, INDIANA, ASSIGNOR TO PACKARD MOTOR CAR COMPANY, OF DETROIT, MICHIGAN, A CORPORATION OF MICHIGAN.

STEERING-ROD CONNECTION.

Original application filed November 30, 1917, Serial No. 204,662. Divided and this application filed October 14, 1922. Serial No. 594,496.

This invention relates to motor vehicles and particularly to steering connections therefor, and the present application is a division of my application, filed November 30, 1917, which has matured into Patent No. 1,451,040.

One of the objects of the present invention is to provide a steering connection with means for supplying lubricant thereto and retaining lubricant on the bearing surfaces.

Another object of the invention is to provide a steering connection in which the bearing is between one of the members and a stud on the other member and the lubricant is fed to the bearing through the stud.

Another object of the invention is to provide a very strong and durable steering connection and one that is readily lubricated and which retains lubricant therein.

Figure 1:
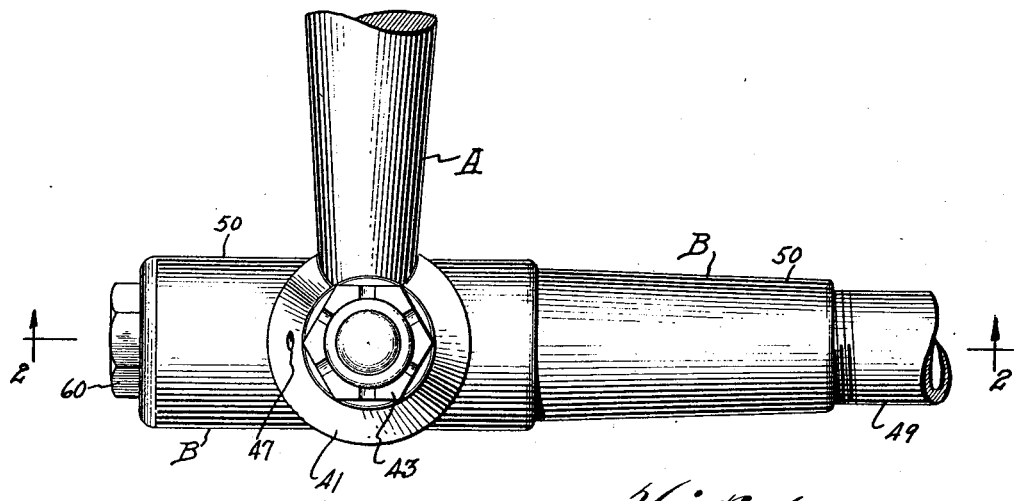
Figure 2:
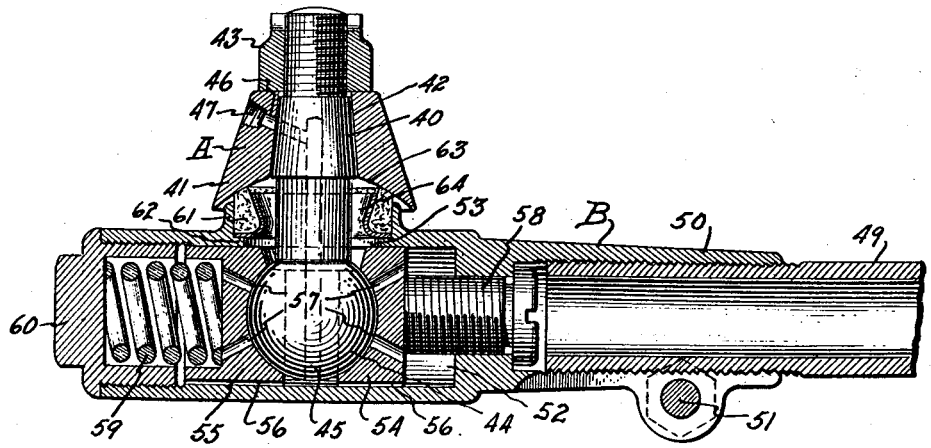

Other objects of the invention will appear from the following description, taken in connection with the accompanying drawing, in which Fig. 1 is a plan view of a motor vehicle steering connection embodying this invention, and Fig. 2 is a section on the line 2—2 of Fig. 1.

Referring to the drawings, A and B represent two steering members to be connected together for relative movement. The member A may represent one of the steering arms of a motor vehicle and the member B may be the steering cross tube or connecting rod.

The steering member A has a transversely supported stud 40 secured in its enlarged head 41 as by the tapered joint 42 and nut 43. The head 44 of the stud is of spherical form and there is a drilled passageway 45 extending through the stud and connecting with a conduit 46 extending laterally to the outside of the head 41 where it is threaded as at 47. The threaded part is adapted to receive a grease cup or grease gun.

The steering member B comprises a rod piece 49 and a socket piece 50, these pieces being detachably connected as by being threaded together and secured by the bolt 51.

The socket piece of the member B is formed with a socket 52 open at one end and having an opening 53 in its side for the entry of the ball-head of the stud 40. Arranged to slide within the socket 52 are a pair of blocks 54 and 55, one of these blocks being arranged on either side of the spherical head 44 of the stud. Each block is provided with one or a series of grooves 56 to permit the passage of lubricant from the lower end of the passage 45 to the rear of the blocks. There are also conduits 57 through the blocks leading from their rear faces to the spherical faces which contact with the spherical head 44 so that lubricant may be fed to the surfaces there in contact.

Before the piece 49 is threaded into the piece 50 of the member B a bolt 58 is threaded into the piece 50 to form a rigid and adjustable abutment for the inner block 54. The other block 55 has a yielding abutment in the form of a spring 59 against which is threaded a cap 60 in the end of the piece 50.

From the above description it will be seen that with the parts 49 and 50 disassembled and the blocks 54 and 55 somewhat separated, the head 44 of the stud 40 may be inserted through the opening 53 of the socket 52 between the blocks. The bolt 58 may then be inserted and adjusted properly against the block 54 and the spring 59 and cap 60 may then be inserted and secured in place. These parts being assembled the rod piece 49 may be threaded into the piece 50 and secured therein by the bolt 51. By this arrangement there is permitted a universal movement to a limited extent between the members A and B.

In order to prevent leakage of lubricant between the members and to likewise prevent the entrance of dirt, a packing ring 61 may be inserted between a seat 62 formed in the socket member 50 around the opening 53 and a spherical seat 63 formed on the enlarged end 41 of the member A. This spherical seat is preferably concentric with the spherical surface of the head 44 of the stud. As shown the packing ring 61 has a supporting ferrule 64 which may be of stamped metal. This ferrule holds the packing ring in place and separates it from the stud 40.

It will be understood that lubricant may be fed through the conduit 46, passage 45 and grooves 56 to the interior of the socket 52 where it will reach the various rubbing surfaces through the conduits 57.

It will be further understood that my invention is not limited to the details of construction shown and other forms may be used without departing from the spirit or scope of the invention.

Having thus described my invention, what I claim and desire to secure by Letters Patent is:

1. In a steering connection, in combination, a steering member formed with a spherical packing ring seat, a stud carried by the member and having a ball substantially concentric with said seat, a tubular steering member surrounding said stud, and a packing ring carried by the tubular member between said seat and said tubular member.

2. In a steering connection, in combination, a steering member having a stud, and a second member comprising a socket piece adapted to receive the stud, said socket piece having an adjustable detachable rigid abutment for said stud at one end of its socket and a removable spring abutment at the other end thereof, said spring abutment comprising a block having a recess, a cap with a sleeve and a spring in said sleeve and recess, said rigid abutment being accessible for adjustment or removal only when said rod piece is detached from the socket piece.

3. In a steering connection, in combination, a steering member having a stud, a second steering member having a socket provided with an opening for the entry of said stud, sliding blocks in said socket bearing against said stud, an adjustable abutment for one of said blocks and an adjustable resilient abutment for the other of said blocks.

4. A steering connection comprising a steering member having a stud provided with a spherical head, a second steering member having a socket provided with an opening for the entry of the stud head, sliding blocks in the socket having spherical depressions adapted to co-act with said head, a rigid adjustable abutment for one of the blocks, a spring abutment for the other block, a cap for adjusting the pressure exerted by said spring abutment and the spring housed within the abutment and cap.

5. In a steering connection, in combination, a steering member having a stud with a spherical head and provided with a lubricant channel, a second steering member having a socket apertured to receive the stud, a packing ring between the said members adapted to seal the joint therebetween, sliding blocks in the socket provided with spherical seats for the head, spring means to maintain contact between the blocks and the head, and means for conducting lubricant from the lubricant channel into the socket and thence through the blocks to the said head.

6. A steering connection comprising a steering member having a stud, a second steering member having a socket provided with an opening for the entry of the stud, slidable blocks in the socket in engagement with the stud, an adjustable abutment for one of the blocks, a spring pressed abutment for the other block and a separate adjustment means for the tension of the spring.

In testimony whereof I affix my signature.

EDWARD J. GULICK.